J. C. HEINZELMAN.
AXLE.
APPLICATION FILED JULY 31, 1907.
905,699.
Patented Dec. 1, 1908.
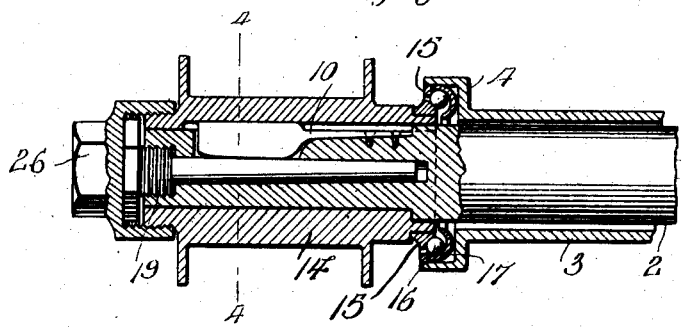
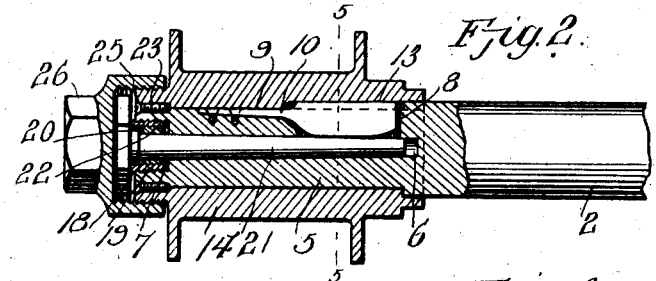
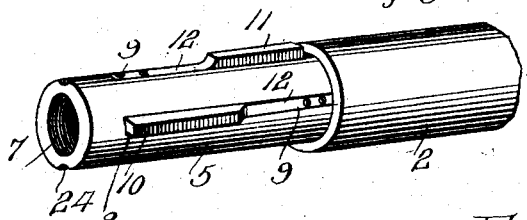
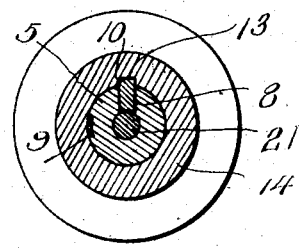
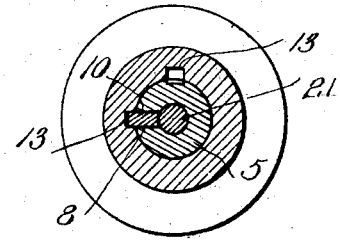
Witnesses
Frank Hough
John F. Byrne
Inventor
John C. Heinzelman,
By Victor J. Evans
Attorney

UNITED STATES PATENT OFFICE.

JOHN C. HEINZELMAN, OF LEEDS, NORTH DAKOTA.

AXLE.

No. 905,699.     Specification of Letters Patent.     Patented Dec. 1, 1908.

Application filed July 31, 1907. Serial No. 386,408.

*To all whom it may concern:*

Be it known that I, JOHN C. HEINZELMAN, a citizen of the United States, residing at Leeds, in the county of Benson and State of North Dakota, have invented new and useful Improvements in Axles, of which the following is a specification.

My invention relates to improvements in wheel attaching devices, and its primary object is to provide a device of this character by means of which a wheel can be rigidly secured to an axle, the invention being especially adapted for securing wheels to the rear or drive axle of an automobile.

A further object of my invention is to provide a wheel attaching device which is simple, durable, one which comprises comparatively few parts, and one which will not materially increase the cost of the axle or the wheels.

With the above and other objects in view, the invention consists in the construction, combination and arrangement of parts hereinafter fully described, claimed and illustrated in the accompanying drawing, wherein:

Figure 1 is a horizontal central section through one end of the rear or drive axle of an automobile, illustrating the application of my improved wheel attaching device. Fig. 2 is a vertical central section thereof. Fig. 3 is a perspective view of one end of the rear or drive axle. Fig. 4 is a section on the line 4—4 of Fig. 1, and Fig. 5 is a section on the line 5—5 of Fig. 2.

Referring to the drawing by reference numerals, 2 designates the rear or the drive axle of an automobile, and 3 the axle casing which is enlarged at one end, as at 4. The axle spindle 5 is provided with a centrally located and longitudinally extending bore 6 which terminates at its outer end in a threaded socket 7. The diameter of the bore 6 gradually decreases inwardly. The axle spindle 5 is also provided with radially arranged openings 8 which extend from the bore 6 to and through the outer surface of the spindle. Longitudinally extending grooves 9 are arranged in the outer surface of the spindle 5 and communicate with the openings 8, the bottom walls of the grooves inclining downwardly in the direction of said openings. Keys 10 consist of heads 11 which are mounted in the openings 8, and reduced shanks 12 which are secured within the grooves 9, said shanks being adapted to yieldingly retain the heads in operative or locking positions. The heads 11 are adapted to engage in longitudinally extending grooves 13 formed in the inner surface of the hub 14. The hub 14 is provided with a cone 15 between which and a ball race 17 are arranged the ball bearings 16. As the heads 11 of the keys engage in the grooves 13 of the hub, the wheel is secured to the axle against rotary motion thereon. A nut 18 is secured to the axle spindle 5 to prevent the longitudinal displacement of the wheel.

The nut 18 is provided with an externally threaded extension 19 adapted to engage in the socket 7 and with an internally threaded socket 20 adapted to receive the head of a bolt 21, which is secured to the nut by means of a threaded member 22. As the bolt 21 is secured to the nut 18, the application of the nut will position the bolt in the bore 6. The bolt 21 is tapered, and is adapted to move the heads 11 of the keys 10 radially and to hold them in frictional engagement with the hub. The inner wall of the hub and the outer surface of the axle spindle are respectively provided with semicircular threaded grooves 23 and 24, said grooves being adapted to receive threaded bolts 25 which assist in preventing the wheel from having any rotary or longitudinal movement on the axle spindle. A cap-nut 26 is applied to and incloses the end of the hub 14.

From the foregoing description taken in connection with the accompanying drawing, the construction and mode of operation of the invention should be apparent without a further extended description. It should also be apparent that the wheel may be readily and quickly applied to and removed from the axle. In view thereof, automobilists will find it to their advantage to carry an extra wheel provided with an inflated tire, thus saving the trouble and time consumed in the removal of a punctured or otherwise injured tire and the substitution of another therefor.

Changes in the form, proportions and minor details of construction may be made within the scope of the claims without departing from the spirit or sacrificing any of the advantages of the invention.

Having fully described and illustrated my invention, what I claim is:

1. In a device of the character described, the combination with an axle provided with a bore and an opening communicating with the bore, of a wheel having the hub thereof provided with a groove, a key movably mounted in the opening and adapted to engage in the groove to prevent the wheel from having any rotary movement on the axle, means adapted to prevent any longitudinal movement on the wheel on the axle, and a bolt carried by said means and adapted to fit in the bore, said bolt being adapted to force the key into frictional engagement with the hub.

2. In a device of the character described, the combination with an axle provided with a threaded socket, a bore communicating with the socket, and an opening communicating with the bore, of a wheel having the hub thereof provided with a groove, a key mounted in the opening and adapted to engage in the groove to prevent the wheel from having any rotary movement on the axle, a nut having threaded engagement with the socket, said nut being adapted to prevent any longitudinal movement of the wheel, and a bolt carried by the nut, said bolt being adapted to be engaged in the bore and force the key into frictional engagement with the hub.

3. In a device of the character described, the combination with a wheel, of an axle provided with a bore and an opening, a key movably mounted in the opening and adapted to engage the wheel to prevent it from having any rotary movement on the axle, and means adapted to be inserted in the bore to secure the key in locking position.

4. In a device of the character described, the combination with a wheel, of an axle provided with an opening and a bore, a key movably mounted in the opening and adapted to engage the wheel to prevent it from having any rotary movement on the axle, a nut, and means carried by the nut, said means being adapted to hold the key in locking position.

In testimony whereof I affix my signature in presence of two witnesses.

JOHN C. HEINZELMAN.

Witnesses:
J. A. CHRISTENSON,
E. F. JONES.